United States Patent
Morris

(10) Patent No.: US 9,652,482 B2
(45) Date of Patent: May 16, 2017

(54) DATA STORAGE MANAGEMENT BASED ON INDICATED STORAGE LEVELS AND OTHER CRITERIA FOR MULTILEVEL STORAGE SYSTEMS

(71) Applicant: TERADATA US, INC., Dayton, OH (US)

(72) Inventor: John Mark Morris, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 252 days.

(21) Appl. No.: 13/969,484

(22) Filed: Aug. 16, 2013

(65) Prior Publication Data

US 2014/0188947 A1 Jul. 3, 2014

Related U.S. Application Data

(60) Provisional application No. 61/747,593, filed on Dec. 31, 2012.

(51) Int. Cl.
*G06F 17/30* (2006.01)
*G06F 3/06* (2006.01)

(52) U.S. Cl.
CPC ...... *G06F 17/30321* (2013.01); *G06F 3/0653* (2013.01); *G06F 17/30312* (2013.01); *G06F 17/30557* (2013.01)

(58) Field of Classification Search
CPC ........ G06F 17/30321; G06F 17/30557; G06F 3/0653; G06F 17/30312
USPC .......... 707/634, 812; 709/219, 224; 711/151
See application file for complete search history.

(56) References Cited

U.S. PATENT DOCUMENTS

| | | | |
|---|---|---|---|
| 6,647,415 B1 * | 11/2003 | Olarig et al. | 709/224 |
| 7,546,354 B1 * | 6/2009 | Fan et al. | 714/12 |
| 8,051,243 B2 * | 11/2011 | Murase | 711/114 |
| 8,959,057 B2 * | 2/2015 | Ganesh | 707/661 |
| 2005/0210130 A1 * | 9/2005 | Tanaka | 709/224 |
| 2006/0069861 A1 * | 3/2006 | Amano | G06F 11/1458 711/151 |
| 2014/0180664 A1 * | 6/2014 | Kochunni et al. | 703/21 |

* cited by examiner

*Primary Examiner* — Vincent Boccio
(74) *Attorney, Agent, or Firm* — Ramin Mahboubian

(57) ABSTRACT

Data can be stored based on one or more indications and one or more other storage criteria. The indications can effectively indicate or identify a storage level for storing data in a multi-storage system. The indications, however, need not be the only basis for storing the data object in a multi-storage system as one or more other storage criteria can also be considered. As a result, the indication can be used to effectively influence data storage but other storage criteria can be used as well to prevent adverse effects caused by undue influence and to ensure the overall efficiency of the system. Also, the one or more other storage criteria can be evaluated or reevaluated on a continual basis.

12 Claims, 5 Drawing Sheets

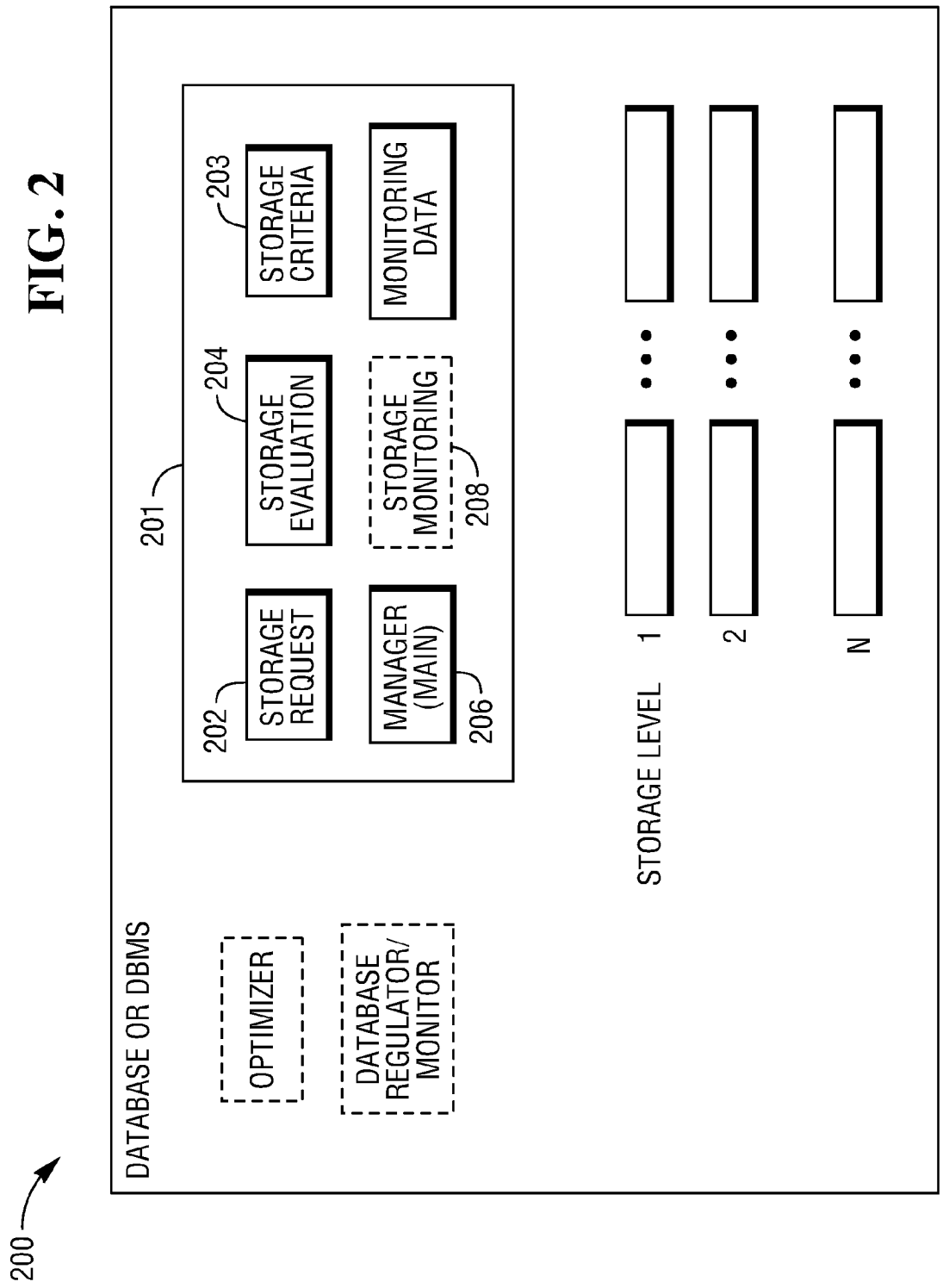

DATA STORAGE MANAGEMENT BASED ON INDICATED STORAGE LEVELS AND OTHER CRITERIA FOR MULTILEVEL STORAGE SYSTEMS

CROSS-REFERENCE TO RELATED APPLICATIONS

This application takes priority of the U.S. Provisional Patent Application No. 61/747,593, entitled: "DATA STORAGE MANAGEMENT BASED ON INDICATED STORAGE LEVELS AND OTHER CRITERIA FOR MULTILEVEL STORAGE SYSTEMS," filed on Dec. 31, 2012, which is hereby incorporated by reference herein in its entirety and for all purposes.

BACKGROUND

Data can be an abstract term. In the context of computing environments and systems, data can generally encompass all forms of information storable in a computer readable medium (e.g., memory, hard disk). Data, and in particular, one or more instances of data can also be referred to as data object(s). As is generally known in the art, a data object can, for example, be an actual instance of data, a class, a type, or a particular form of data, and so on.

Generally, one important aspect of computing and computing systems is storage of data. Today, there is an ever increasing need to manage storage of data in computing environments. Databases provide a very good example of a computing environment or system where the storage of data can be crucial. As such, to provide an example, databases are discussed below in greater detail.

The term database can also refer to a collection of data and/or data structures typically stored in a digital form. Data can be stored in a database for various reasons and to serve various entities or "users." Generally, data stored in the database can be used by one or more the "database users." A user of a database can, for example, be a person, a database administrator, a computer application designed to interact with a database, etc. A very simple database or database system can, for example, be provided on a Personal Computer (PC) by storing data (e.g., contact information) on a Hard Disk and executing a computer program that allows access to the data. The executable computer program can be referred to as a database program, or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and are used in various business and organizations (e.g., banks, retail stores, governmental agencies, universities). Today, databases can be very complex. Some databases can support several users simultaneously and allow them to make very complex queries (e.g., give me the names of all customers under the age of thirty five (35) in Ohio that have bought all the items in a given list of items in the past month and also have bought a ticket for a baseball game and purchased a baseball hat in the past 10 years).

Typically, a Database Manager (DBM) or a Database Management System (DBMS) is provided for relatively large and/or complex databases. As known in the art, a DBMS can effectively manage the database or data stored in a database, and serve as an interface for the users of the database. For example, a DBMS can be provided as an executable computer program (or software) product as is also known in the art.

It should also be noted that a database can be organized in accordance with a Data Model. Some notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation Language, and a Query Language.

Today, databases have become prevalent in virtually all aspects of business and personal life. Moreover, usage of various forms of databases is likely to continue to grow even more rapidly and widely across all aspects of commerce, social and personal activities. Generally, databases and DBMS that manage them can be very large and extremely complex partly in order to support an ever increasing need to store data and analyze data. Typically, larger databases are used by larger organizations, larger user communities, or device populations. Larger databases can be supported by relatively larger capacities, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A current popular type of database is the relational database with a Relational Database Management System (RDBMS), which can include relational tables (also referred to as relations) made up of rows and columns (also referred to as tuples and attributes). In a relational database, each row represents an occurrence of an entity defined by a table, with an entity, for example, being a person, place, thing, or another object about which the table includes information.

One important objective of databases, and in particular a DBMS, is to optimize the performance of queries for access and manipulation of data stored in the database. Given a target environment, an "optimal" query plan can be selected as the best option by a database optimizer (or optimizer). Ideally, an optimal query plan is a plan with the lowest cost (e.g., lowest response time, lowest CPU and/or I/O processing cost, lowest network processing cost). The response time can be the amount of time it takes to complete the execution of a database operation, including a database request (e.g., a database query) in a given system. In this context, a "workload" can be a set of requests, which may include queries or utilities, such as, load that have some common characteristics, such as, for example, application, source of request, type of query, priority, response time goals, etc.

As noted above, one important aspect of computing environment is storage of data. Today, there is an ever increasing need to manage storage of data in computing environment, especially in database environment.

In view of the foregoing, techniques for storing data in computing systems and environments, especially database systems and environments are highly useful.

SUMMARY

Broadly speaking, the invention relates to computing environments and systems. More particularly, the invention relates to techniques for storing data in computing environments and systems, including database environments and systems.

In accordance with one aspect of the invention, data can be stored in a various Storage Levels of a multi-storage system, based on one or more indications and one or more other storage criteria.

The indications can effectively indicate or identify at least one storage level for storing at least one data object in a multi-storage system that includes multiple storages (e.g., storage devices) that are ranked or organized in accordance with various storage levels. By way of example, the indications can be provided as a user request or command that identifies a data object (e.g., a database table) and/or data associated with a command or operations (e.g., a particular database query) for storage in a particular storage level (e.g., Storage Level one (1) formed by one or more cache memory). In one embodiment, the indication can be provided as a "hot index" for a database. The "hot index" can, for example, be used as an optional index and used in a similar manner as other optional indexes in a database (e.g., as an index or a database table or a Join operation, or a transaction).

However, the indications, need not be the only basis for storing the data object in a multi-storage system. As noted above, one or more other storage criteria can also be considered in determining whether to store or continue to store the data object in a particular storage level that may be indicated by the indication. As a result, the indication can be used to effectively influence data storage but other storage criteria can be used as well to prevent adverse effects that can be caused by undue influence of indications. This can improve ensure and/or improve the overall efficiency of the system. It will be appreciated that the one or more other storage criteria considered in determining whether to store or continue to store the data object in a particular storage level can, for example, include the same criteria as used by the user (e.g., frequency of access) to serve as a verification mechanism, as well as other criteria that the users may not be aware of (e.g., current size of capacity of storage, relative importance of data even as may have been individually determined by the users themselves) to ensure and/or improve the overall efficiency of a computing system.

Also, it will be appreciated that the one or more other storage criteria (noted above) can be evaluated or reevaluated on a continual basis in accordance with another aspect of the invention. As a result, storage assignments that were not or are no longer advisable can be effectively corrected by reassigning data to a Storage Level this is more appropriate as determined based on the one or more other storage criteria. This can also ensure and/or improve that the overall efficiency of a computing system is maintained or at least achieved some time after an unsound storage assignment has been made, rather than possibly honoring the assignment as a general rule and not reevaluating it.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 2 depicts a data storage management system in a database environment in accordance with one embodiment of the invention.

DETAILED DESCRIPTION

Figure 1A:
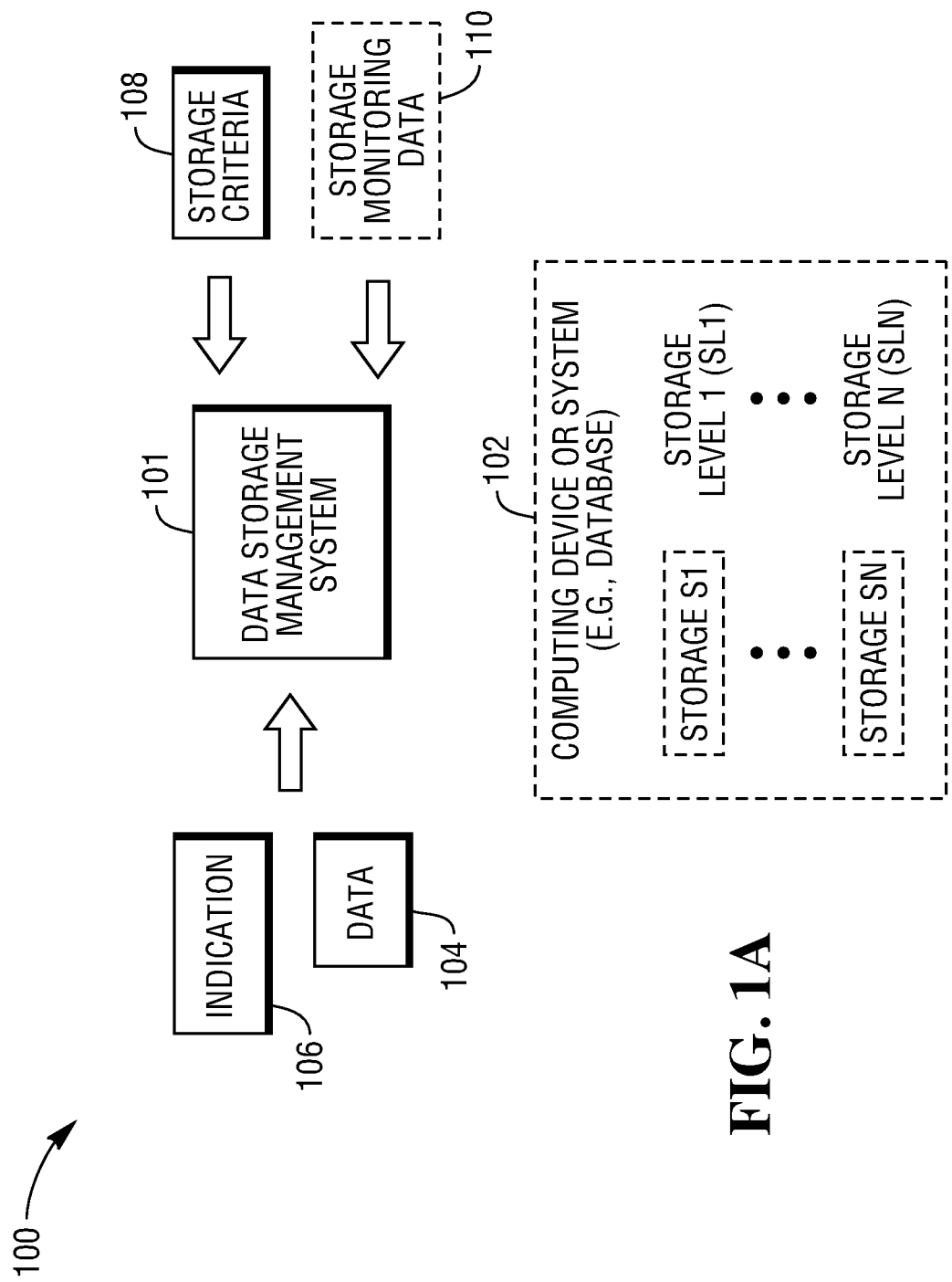
FIG. 1A depicts a computing environment with a data storage management system in accordance with one embodiment of the invention.

As noted in the background section, one important aspect of computing environment is storage of data. Today, there is an ever increasing need to manage storage of data in computing environment, especially in database environment. To this end, more recently, more sophisticated data management schemes have been introduced which aim to store or relocate data in a database based on frequency of access in order to further enhance performance. As such, data deemed to be accessed more frequently ("hot data") may be stored or relocated, for example, from a hard disk to a Solid State Drive (SSD) or cache memory to facilitate faster access to data that is more frequently accessed in order to improve the overall performance of the system.

Generally, conventional techniques for storing data in computing systems and environments, especially database systems and environments are highly useful. However, conventional storage techniques may not provide the flexibility needed to balance the need or perceived needs of the users of the computing systems with the requirements for operating these systems in an efficient manner. For example, in a computing system, "hot data" can be stored in a storage device with a relatively faster access time, and other data (e.g., "cold data") can be stored in storage device with a relatively slower access time. However, such a scheme may not fully address the needs of users that may, for example, want a particular database queries and/or set of data to be processed and/or made available as soon as possible. By way of example, it may be desirable to allow the database queries submitted by high ranking officer of a business organization to be executed as soon as possible despite the frequency of data access (i.e., how often such requests are submitted).

Hence, there is a need to provide a mechanism that allows selection of data, especially in a form that can be submitted by users, for storage in a particular form of storage (e.g., memory or SSDs with relatively faster access time than HHDs). However, allowing this type of selection, especially when user selection is the determinative factor or only factor can have serious drawback and negative effectives on a computing system. By way of example, a database user may inadvertently designate data (e.g., a database table) as "hot data" with the understanding that is would be used frequently, but, the data selected by the user is not actually used frequently and should not be treated as such. As another example, initially, data may be correctly designated as "hot data" by a database user but the data can later cease to be used as often as it had been before and should no longer be treated as "hot data." Generally, it is not desirable to put users, especially end-users, in charge of specific data storage management and maintenance, yet there is a need to give them some control over such activities.

In view of the foregoing, improved techniques for storing data in a computing environments and systems, especially database environments and systems are needed and would be very useful.

Accordingly, improved techniques for storing data in a computing environments and systems, including database environments and system are disclosed.

More specifically, it will be appreciated that data can be stored in a various Storage Levels of a multi-storage system, based on one or more indications and one or more other storage criteria, in accordance with one aspect of the invention.

The indications can effectively indicate or identify at least one storage level for storing at least one data object in a multi-storage system that includes multiple storages that are ranked or organized in various storage levels. By way of example, the indications can be provided as a user request or command that identifies a data object (e.g., a database table) and/or data associated with a command or operations (e.g., a particular database query) for storage in a particular storage level (e.g., Storage Level one (1) formed by one or more cache memory). In one embodiment, the indication can be provided as a "hot index" for a database. The "hot index" can, for example, be used as an optional index and used in a similar manner as other optional indexes in a database (e.g., as an index or a database table or a Join operation, or a transaction).

The indication, however, need not be the only basis for storing the data object in a multi-storage system. As noted above, one or more other storage criteria can also be considered in determining whether to store or continue to store the data object in a particular storage level that may be indicated by the indication. As a result, the indication can be used to effectively influence data storage but other storage criteria can be used as well to prevent adverse effects caused by undue influence and to ensure the overall efficiency of the system. It will be appreciated that the one or more other storage criteria considered in determining whether to store or continue to store the data object in a particular storage level can include the same criteria as used by the user (e.g., frequency of access) to serve as a verification mechanism, as well as other criteria that the users may not be aware of (e.g., current size of capacity of storage, relative importance of data even as may have been individually determined by the users themselves) to ensure the overall efficiency of a computing system.

Also, it will be appreciated that the one or more other storage criteria can be evaluated or reevaluated on a continual basis in accordance with another aspect of the invention. As a result, storage assignments that were not or are no longer advisable can be effectively corrected by reassigning data to a Storage Level this is more appropriate as determined by the one or more other storage criteria. This can also ensure that the overall efficiency of a computing system is maintained or at least achieved some time after an unsound storage assignment may have been made and possibly honored as a general rule.

Embodiments of these aspects of the invention are also discussed below with reference to FIGS. 1A-5. However, those skilled in the art will readily appreciate that the detailed description given herein with respect to these figures is for explanatory purposes as the invention extends beyond these limited embodiments.

FIG. 1A depicts a computing environment 100 with a data storage management (DSMS) system 101 in accordance with one embodiment of the invention. Referring to FIG. 1A, the DSMS 101 can effectively facilitate and/or manage storage of data 104 in the computing environment 100.

More particularly, DSMS 101 can manage storage of data 104 in multiple storages (e.g., storage devices, portions of a storage device) S1-SN that are respectively associated with multiple storage levels SL1-SLN that can be ordered based on or more storage ordering criteria (e.g., relative access speed, relative storage capacity, relative reliability). The multiple storage S1-SN can form or be a multi-storage data system or device. The storage levels SL1-SLN can represent multiple conceptual levels defined based on one or more storage ordering criteria for arranging multiple storages SL1-SLN. It should be that more than one (1) storage S can be in the same storage level SLi. In other words, referring to FIG. 1A, a storage Si can represent multiple storage portions or multiple storage devices. By way of example, one or more memory-based storages (e.g., cache, RAM memory, processors cache) can be in one Storage Level, and one or more storages that are based on Solid State Drive (SSD) can be in another Storage Level, and so on. As suggested by FIG. 1A, the storages S1-SN can, for example, be part of a computing device and/or computing system 102.

In any case, it will be appreciated that the DSMS 101 can manage storage of the data 104 in multiple storages S1-SN based on at least one indication 106 and one or more other storage criteria 108. Generally, the indication(s) 106 can be indicative of at least one storage level for storing at least one data object in the storages 1-N or a multi-storage system or device that they can represent. BY way of example, the indication(s) 106 can be provided and obtained by the DSMS 101 as user input that is indicative of a desire to store a particular data object A and/or one or more data objects associated with a command, user, priority, etc. in a particular Storage Level (SLi). For example, in the context of a database, a database command or request can be provided that is indicative of a user desire to store data associated with a table and/or a query from a particular user or of a particular priority in a high-level access storage (e.g., memory). As such, the DSMS 101 can facilitate storage of the data 104 in a Storage Level indicated by the indication(s) 106.

Moreover, it will be appreciated that in addition to the indication(s) 106, DSMS 101 can also consider one or more other storage criteria 108. In other words, in managing and facilitating storage of the of the data 104, the DSMS 101 need not be limited to the indication(s) 106 and can consider one or more other storage criteria 108. It will be appreciated that one or more other storage criteria 108 can be virtually anything, including, for example, assessed, estimated and/or actual frequency of usage, including physical and virtual access of data, limit of storage or space availability in a particular storage level, initial or perceived priority associated with data, current or actual assessed priorities that may differ from initial or perceived priorities, "hotness" of data defined based one or more criteria, including, for example, frequency of data and determined priority, and comparative measures for comparing data with respect to other data.

In any case, the DSMS 101 can effectively use the one or more other storage criteria 108 to determine whether to store and/or to continue to store the data object 104 in a Storage Level Si as indicated by the indication(s) 106. In other words, the DSMS 101 can store data 104 as indicated by the indication(s) 106 but can also effectively test the soundness of storing data 104 in the manner indicated by the indication(s) 106 based on one more or more other storage criteria 108. Although, generally, the one or more storage criteria 108 can be system defined, user defined and any combination thereof, it will be appreciated that at least one storage criteria 108 can be defined by a system administrator and used to test the soundness of indication(s) 106 that may be provided by user(s).

Moreover, the DSMS 101 can effectively monitor storage of the data 104 to determine based on the one or more storage criteria 108 whether to allow the storage of the data 104 to continue as may have been indicated by the indication(s) 106. As such, although DSMS 101 could allow data 104 to be stored as indicated by the indication(s) 106, it can later determine not to allow data 104 to be stored in the Storage Level indicated by the indication(s) 106.

It should be noted that determining of whether to store or continue to store the data 104 in a Storage Level SLi indicated by the indication(s) 106, based on one or more storage criteria 108, can also be made based on monitoring performed by the DSMS 101 or another component (not shown). By way of example, one or more storage attributes associated with a data object can be monitored to determine one or more storage rating values for the data object. In the example, one or more storage attributes (e.g., data "hotness," data "priorities") can be defined and monitored for one or more selected data objects or across a system to achieve a storage rating system for data. As an example, the number of times data in a storage portion (e.g., a cylinder on a storage drive) is accessed can be counted and/or data associated with a high priority database request can be assigned a high priority in order to obtain storage ratings for virtually all of data stored in a system.

At any rate, the DSMS 101 can be configured to monitor storage one or more attributes associated with the one or more storage criteria 108 to obtain storage monitoring data 108 and/or can be configured to merely obtain the storage monitoring data 108 as data monitored and provide by another component (e.g., a system storage monitor, a database regulator). The storage monitoring data 108 can allow the DSMS 101 to effectively evaluate the one or more storage criteria 108 in order to determine whether to allow storage or continue to allow storage of the data 104 in a Storage Level Si as indicated by the indicator(s) 106. By way of example, data "hotness" rating can be determined based on frequency of access (physical as well as virtual access) as well as other factors, including, for example, priority associated with the data. In addition, other criteria, including, for example, amount of space currently available in a given Storage Level Si, relative "hotness" rating of data can be compared with other data, for example, also requested to be stored or already stored in the given Storage Level (Si) can be considered by the storage evaluation component 204 in determining whether to allow storage or continue to allow storage of data in the Storage Level Si as indicated or requested by the indication or request 210. In effect, this evaluation or monitoring can be done on a continual basis to avoid or counter harmful effects of the storage priorities and assignments that may made been made by user while still allowing the users of databases to make such requests or assignments for storage of data as they may see fit. As such, the evaluation or monitoring can provide a safety mechanism that depending on the desired configuration may deny requests for storage of data in a particular storage level SLi if one or more determined criteria is not met, or allow them initially and later effectively cancel the assignment of data to a particular storage level SLi when it is determined that one or more determined criteria are not met or are no longer met. Hence, user requests can be effectively balanced with a system of check and balances that can be performed on a continual basis to ensure the system will be well balanced.

Although depicted as a separate component in FIG. 1A, those skilled in the art will readily appreciate that the DSMS 101 can be part of the computing device 110. Those skilled in the art will also readily appreciate that the DSMS 101 can be provided as one or more hardware and/or software components, for example, at least in part as computer executable code stored in a computer readable storage medium (not shown) and executed by one or more processors (not shown).

Figure 1B:
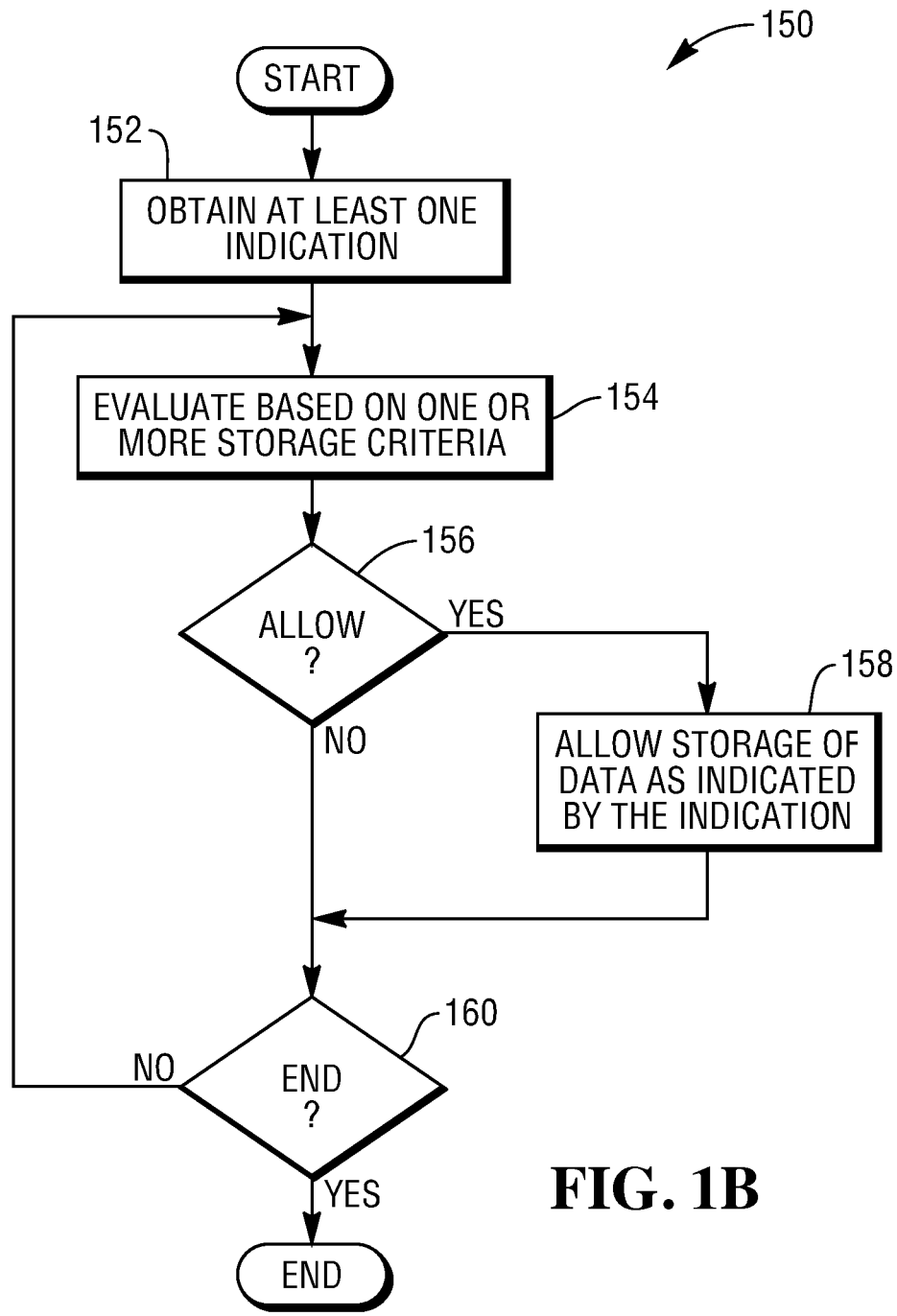
FIG. 1B depicts a method for managing storage of data in a multi-level storage in accordance with one embodiment of the invention.

FIG. 1B depicts a method 150 for managing storage of data in a multi-level storage in in accordance with one embodiment of the invention. The multiple storages can be part of a multi-storage system. More particularly, the multiple storages can be respectively associated with multiple storage levels in an arrangement such that each one of the storage levels includes one or more storages of the multiple storages of multi-storage system.

Referring to FIG. 1B, initially, at least one indication is obtained (152) The indication can be indicative of at least one storage level for storing at least one data object in the multi-storage system. Next, the indication can effectively be evaluated (154) based on one or more storage criteria. Accordingly, it can be determined (156) based on one or more storage criteria whether to allow (or continue to allow) the at least one data object to be stored in at least one storage of the at least one storage level as indicated by the at least one indication. Thereafter, the at least one data object can be allowed (158) to be stored (or continued to be stored) in the at least one storage level indicated by the at least one indication if it is determined (156) to do so. Thereafter, the method 150 can continue to evaluate or reevaluate the decision (160) made to allow or effectively deny storage of the at least one data object in the at least one storage of the at least one storage level, as indicated by the at least one indication, until it is determined (158) to end the method 150, for example, as a result of system shutdown.

Referring back to FIG. 1A, the DSMS 101 is especially useful for a database environment. As such, a DSMS provided in a database environment will be discussed in greater detail. To further elaborate, FIG. 2 depicts a DSMS 201 in a database environment 200 in accordance with one embodiment of the invention. As suggested by FIG. 2, DSMS 201 can, for example, be part of a DBMS provided in the database environment 200.

Referring to FIG. 2, conceptually, the DSMS 201 can include multiple components, including an storage request component 202, and storage evaluation component 204, and a manager (or a main) component 206, as well other optional components, such as, storage monitoring 208. This storage request component 202 can effectively serve as an interface for processing indications 210 indicative of a storage level for storing a data object. In a database environment, the indications 210 can be received as a database request and/or command 210 provided by a database user. By way of example, a "hot index" can be provided as an option similar to other optional indexing mechanisms that are provided in database environments. As such, in the example, a "hot index" can, for example, can be provided as an indexing mechanism that can be used on tables, partitions and/or transactions of the database, as well as an indexing mechanism that can be used for various database requests, commands and constructs (e.g., hot index on or as a join index).

In any case, the storage request component 202 can receive, as input, indications or requests 210, for storing data in a particular data storage level LS1-SLN. In the example, a data storage level L1-LN can represent a number of storages or types of storages locally organized. BY way of example, SL1 can represent cache memory available (e.g., FSG cache for caching hot data), SL2 can present fast-access storage available for storing hot data (e.g., SSD storage for storing hot data), and SL3 can be slow-access storage (e.g., disk drives with relatively larger capacity for storing data that is not hot).

The storage evaluation component 204, can effectively evaluate Indications or requests 210 in order to determine whether to allow storage of the data into the particular data storage level indicated or requested. This evaluation can be performed by the storage evaluation component 204 based on one or more storage criteria 220 as well as monitoring data 224. The monitoring data 224 can reflect the information gathered based on one or more storage attributes associated with the one or more storage criteria 220.

As suggested by FIG. 2, the monitoring data 224 can be effectively collected at least in part by a storage monitoring component 208. Alternatively, or in addition to the monitoring that can be performed by the monitoring component 208, monitoring data 224 can be provided by one or more other components in the database environment 200, such as, for example a database Optimizer, a database monitor or regulator, etc. the manager component 206 can effectively manage the activities of the other components and/or facilitate communication between them in order to determine whether to store or continue to store the data object in a storage level SLi as indicated by the indication or request 210.

Additional information regarding a database regulator that can be provide information relating to storage usage of data in order to assist in making decision regarding assignment of data to a particular storage or storage level is, for example, described in the U.S. Pat. No. 7,702,676, entitled: "PARALLEL VIRTUAL OPTIMIZATION," by Brown et al., which is hereby incorporated by reference herein, in its entirety with all the material it may incorporate by reference and for all purposes.

Additional information regarding techniques for considering priority of data in the form of priority of database workloads in assessing data "temperature" or "hotness" are described in the U.S. patent application Ser. No. 11/716,880 entitled: "workload priority influenced data temperature, by Morris et al., which is hereby incorporated by reference herein, in its entirety with all the material it incorporates by reference, and for all purposes.

It will be appreciated that the data storage management system DSMS 201 (shown in FIG. 2) is especially suitable for large database systems with a large number of storage device, including large parallel or multiprocessing database systems that may be comprised of multiple database nodes (or nodes) that each can have their own storage devices and processors. As such, the data DSMS 201 is described further in the context of a parallel or multiprocessing database system.

Figure 3:
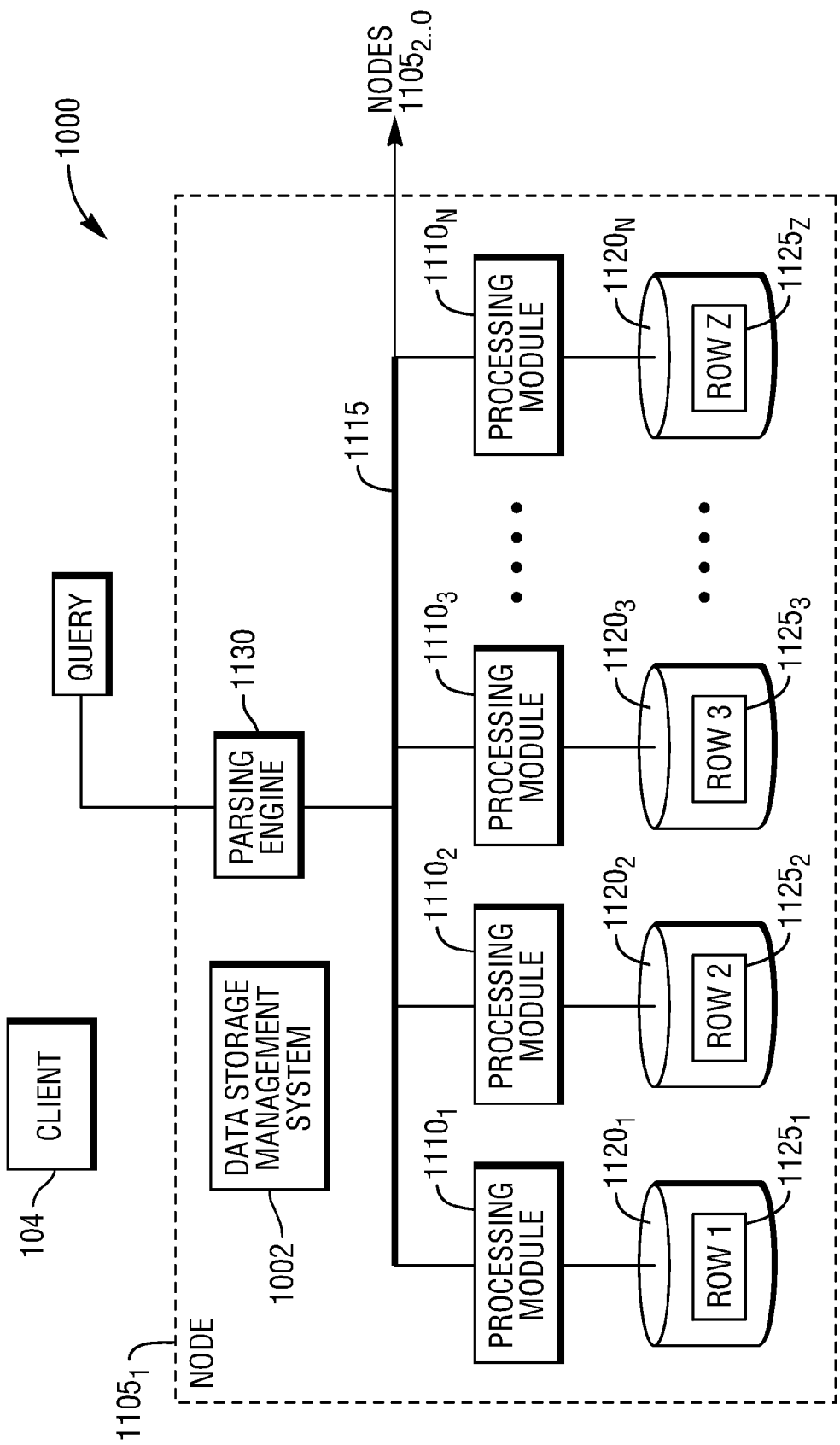
FIG. 3 depicts a database node of a database system or a Database Management System (DBMS) in accordance with one embodiment of the invention.

To further elaborate, FIG. 3 depicts a database node 1105 of a database system or a Database Management System (DBMS) 1000 in accordance with one embodiment of the invention. The DBMS 1000 can, for example, be provided as a Teradata Active Data Warehousing System. It should be noted that FIG. 3 depicts in greater detail an exemplary architecture for one database node $1105_1$ of the DBMS 1000 in accordance with one embodiment of the invention.

Referring to FIG. 3, the DBMS node $1105_1$ includes multiple processing units (or processing modules) 1110-N connected by a network 1115, that manage the storage and retrieval of data in data-storage facilities $1120_{1-N}$. Each of the processing units 1110-N can represent one or more physical processors or virtual processors, with one or more virtual processors (e.g., an Access Module Processor (AMP)) running on one or more physical processors in a Teradata Active Data Warehousing System). For example, when provided as AMPs, each AMP can receive work steps from a parsing engine (PE) 1130 which is also described below.

In the case in which one or more virtual processors are running on a single physical processor, the single physical processor swaps between the set of N virtual processors. For the case in which N virtual processors are running on an M-processor node, the node's operating system can schedule the N virtual processors to run on its set of M physical processors. By way of example, if there are four (4) virtual processors and four (4) physical processors, then typically each virtual processor could run on its own physical processor. As such, assuming there are eight (8) virtual processors and four (4) physical processors, the operating system could schedule the eight (8) virtual processors against the four (4) physical processors, in which case swapping of the virtual processors could occur.

In the database system 1000, each of the processing units $1110_{1-N}$ can manage a portion of a database stored in a corresponding one of the data-storage facilities $1120_{1-N}$. Also, each of the data-storage facilities $1120_{1-N}$ can include one or more storage devices (e.g., disk drives). Again, it should be noted that the DBMS 1000 may include additional database nodes $1105_{2-O}$ in addition to the database node $1105_1$. The additional database nodes $1105_{2-O}$ can be connected by extending the network 1115. Data can be stored in one or more tables in the data-storage facilities $1120_{1-N}$. The rows $1125_{1-z}$ of the tables can, for example, be stored across multiple data-storage facilities $1120_{1-N}$ to ensure that workload is distributed evenly across the processing units $1110_{1-N}$. In addition, a parsing engine 1130 can organize the storage of data and the distribution of table rows $1125_{1-z}$ among the processing units $1110_{1-N}$. The parsing engine 1130 can also coordinate the retrieval of data from the data-storage facilities $1120_{1-N}$ in response to queries received, for example, from a user. The DBMS 1000 usually receives queries and commands to build tables in a standard format, such as, for example, SQL. Parsing engine 1130 can also handle logons, as well as parsing the SQL requests from users, turning them into a series of work steps that can be sent to be executed by the processing units $1110_{1-N}$.

For example, a client-side Host 1004 (e.g., a Personal Computer (PC), a server) can, be used to logon to the database system 1000 provided as a Teradata DBS server. Commination between the client-side Host 1004 and the database system 1000 can be facilitated by a database communicating mechanism, for example, by an ANSI CLI (Call Level Interface) standard that can include parcel requests and responses that facilitate the movement of files resident on the client-side host 1004 over to the database system 1000.

For example, the rows $1125_{1-z}$ can be distributed across the data-storage facilities $1120_{1-N}$ by the parsing engine 1130 in accordance with their primary index. The primary index defines the columns of the rows that are used for calculating a hash value. The function that produces the hash value from the values in the columns specified by the primary index may be called the hash function. Some portion, possibly the entirety, of the hash value can be designated a "hash bucket". As such, the hash buckets can be assigned to data-storage facilities $1120_{1-N}$ and associated processing units $1110_{1-N}$ by a hash bucket map. The characteristics of the columns chosen for the primary index determine how evenly the rows are distributed.

Referring again to FIG. 3, it should be noted that a data storage management system (DSMS) 1002 can be provided as a central component for the processing units $1110_{1-N}$. However, it should be noted that each one of the processing units $1110_{1-N}$ can be effectively provided with a local data management system (not shown) that can serve as a local component and possibly collaborate with the central data management system 1002. Of course, various other configurations are possible and will become readily apparent in view of the foregoing.

Figure 4:
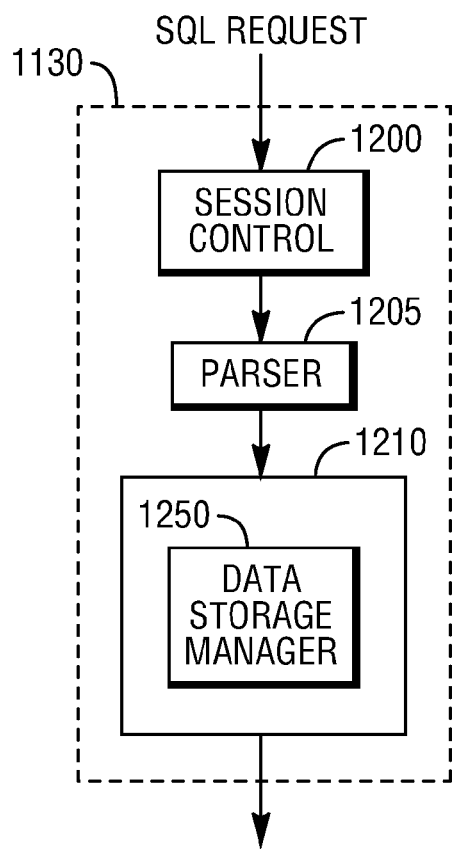
FIG. 4 depicts a Parsing Engine (PE) in accordance with one embodiment of the invention.
Figure 5:
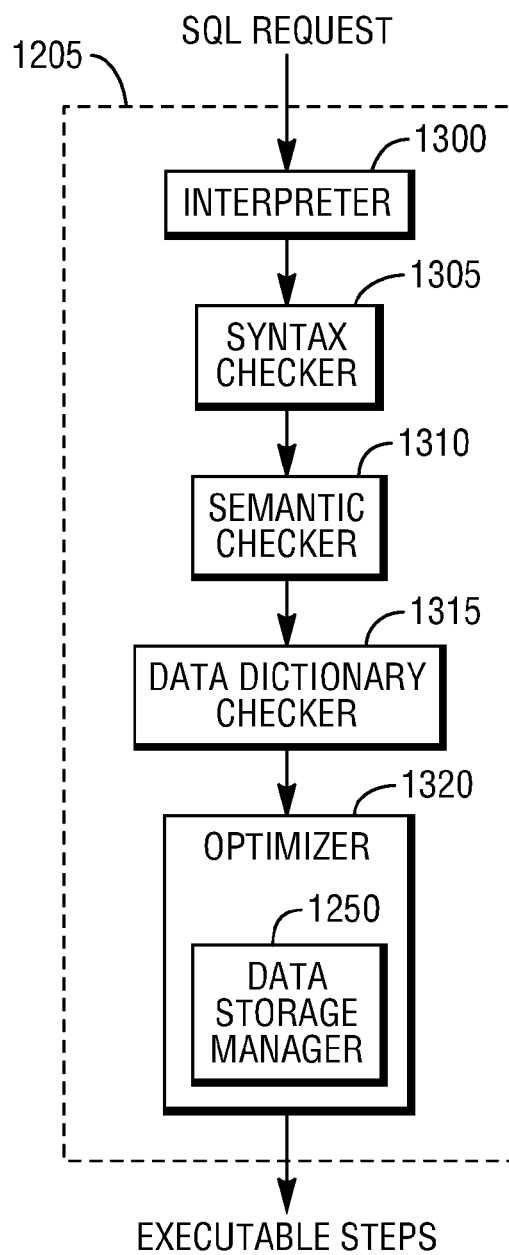
FIG. 5 depicts a Parser in accordance with one embodiment of the invention.

Referring now to FIG. 4, in one exemplary system, the parsing engine 1130 can be made up of three components: a session control 1200, a parser 1205, and a dispatcher 1210. In the example, the session control 1200 provides the logon and logoff function. It accepts a request for authorization to access the database, verifies it, and then either allows or disallows the access. When the session control 1200 allows a session to begin, a user may submit a SQL request, which is routed to the parser 1205. Regarding the dispatcher 1210, it should be noted that some monitoring functionality for data management and/or workload management may be performed by a regulator to monitor workloads and usage of the resources, for example, by using internal messages sent from the AMPs to the dispatcher 1210. The dispatcher 1210 can provide an internal status of every session and request running on the system, for example, by using internal messages sent from the AMPs to the dispatcher 1210. In the example, the dispatcher 1210 can provides an internal status of every session and request running on the system. As such, at least part of a database management (1250) can be provided by the dispatcher 1210 in accordance with one embodiment of the invention. The dispatcher 1210 can also operate as a workload dispatcher in order to effectively manage workloads, as well as storage of data, including storage of data in a particular Storage Level SLi in accordance with the techniques disclosed above. As such, at least part of data management system (1250) can be provided by the dispatcher 1210 in accordance with one embodiment of the invention As illustrated in FIG. 5, the parser 1205 interprets the SQL request 1300, checks it for proper SQL syntax 1305, evaluates it semantically 1310, and consults a data dictionary to ensure that all of the objects specified in the SQL request actually exist and that the user has the authority to perform the request 1305. Finally, the parser 1205 runs an optimizer 1320, which can generate the least expensive plan to perform the request. It will be appreciated that the optimizer 1320 can also be configured to take part in assignment of data to a particular Storage Level (SLi) in accordance with the techniques disclosed above. As such, at least part of data management system (1250) can be provided by the optimizer 3120 in accordance with one embodiment of the invention.

Generally, various aspects, features, embodiments or implementations of the invention described above can be used alone or in various combinations. Furthermore, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described is this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method, implemented at least partly by a device, for managing storage of data in multiple storages of a multi-storage system, wherein the multiple storages are respectively associated with multiple storage levels associated with different types of storages that are designated ranks in accordance with one or more storage criteria, and wherein each one of the storage levels is associated with one or more storages of the same type in the multiple storage system, and wherein the method comprises:

monitoring one or more storage attributes associated with least one data object to assign one or more storage rating values for the at least one data object;

thereafter, obtaining at least one indication indicative of at least one storage level identified for storing the at least one data object in the multi-storage system;

determining based on the currently assigned one or more storage rating values for the at least one object and the designated ranking of the at least one storage level as indicated by the at least one indication, whether to allow or continue to allow the at least one data object to be stored in at least one storage of the at least one storage level as indicated by the at least one indication; and allowing the at least one data object to be stored or continued to be stored in the at least one storage level indicated by the at least one indication when the determining determines to allow or continue to allow the at least one data object to be stored in at least one storage of the at least one storage level.

2. The method of claim 1, wherein the one or more storage attributes include one or more of the following: usage, physical access, virtual access, initial priority, current priority, actual usage, estimated usage, actual physical access, estimated physical access, actual virtual access, estimated virtual access, size of a storage, current capacity of storage, importance of data, and relative measure of importance of data.

3. The method of claim 1, wherein the method further comprises: determining whether to allow the at least one data object to remain in the least one storage with the at least one storage level indicated by the at least one indication.

4. The method of claim 1, wherein the storage levels are ranked in the order of access speed.

5. The method of claim 1, wherein each one of the storage levels include one or more of the following: memory, SSD, HDD, cache memory, processor memory.

6. The method of claim 1, wherein the indication is provided as a database command or request.

7. The method of claim 6, wherein the indication is provided as hot database index for indexing that is to be stored in one or more relatively fast access storages of the multiple storages providing faster access than at least one other storage device of the multiple storages.

8. The method of claim 1, wherein the one or more other store criteria include one or more of the following: frequency of usage, priority, and capacity of the at least one storage.

9. The method of claim 8, wherein the priority includes priority associated with a database workload and relative priority of the at least one data object with respect to other data stored or to be stored in the at least one storage level.

10. A device that includes one or more processors configured to:
manage storage of data in multiple storages of a multi-storage system, wherein the multiple storages include non-transitory computer readable storage mediums that are respectively associated with multiple storage levels associated with different types of storages that are designated ranks in accordance with one or more storage criteria, and wherein each one of the storage levels is associated with one or more storages of the same type in the multiple storage system, and wherein the one or more processors are further configured to:
monitor one or more storage attributes associated with least one data object to assign one or more storage rating values for the at least one data object;
thereafter, obtain at least one indication indicative of at least one storage level identified for storing the at least one data object in the multi-storage system;
determine based on the currently assigned one or more storage rating values for the at least one object and the designated ranking of the at least one storage level as indicated by the at least one indication, whether to allow or continue to allow the at least one data object to be stored in at least one storage of the at least one storage level as indicated by the at least one indication; and
allow the at least one data object to be stored or continued to be stored in the at least one storage level indicated by the at least one indication when the determining determines to allow or continue to allow the at least one data object to be stored in at least one storage of the at least one storage level.

11. The device of claim 10, wherein the device includes a database system with multiple nodes, wherein each node is organized with two or more of the multiple storage levels.

12. A non-transitory computer readable storage medium storing at least executable code for managing storage of data in multiple storages of a multi-storage system, wherein the multiple storages are respectively associated with multiple storage levels associated with different types of storages that are designated ranks in accordance with one or more storage criteria, and wherein each one of the storage levels is associated with one or more storages of the same type in the multiple storage system, and wherein the executable code includes:
executable code that when executed monitors one or more storage attributes associated with least one data object to assign one or more storage rating values for the at least one data object
executable code that when executed obtains at least one indication indicative of at least one storage level for storing at least one data object in the multi-storage system;
executable code that when executed determines based on the currently assigned one or more storage rating values for the at least one object and the designated ranking of the at least one storage level as indicated by the at least one indication whether to allow or continue to allow at least one data object to be stored in at least one storage of the at least one storage level as indicated by the at least one indication; and
executable code that when executed allows the at least one data object to be stored or continued to be stored in the at least one storage level indicated by the at least one indication when the determining determines to allow or continue to allow the at least one data object to be stored in at least one storage of the at least one storage level.

* * * * *